F. L. O. WADSWORTH.
TREATING METAL.
APPLICATION FILED OCT. 21, 1907.
1,050,878.
Patented Jan. 21, 1913.
4 SHEETS—SHEET 1.
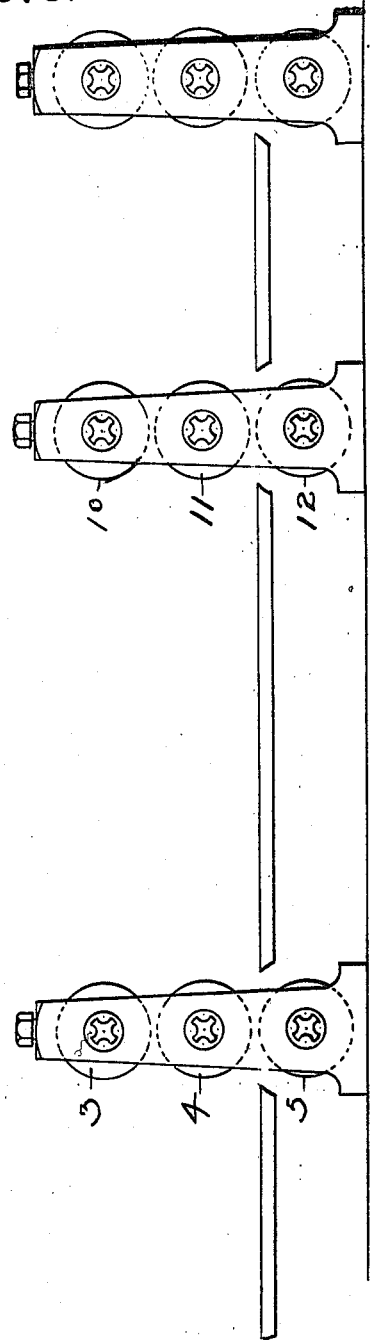
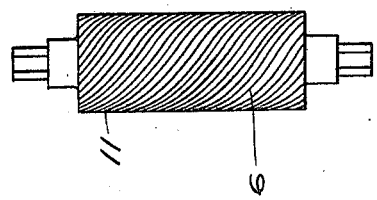
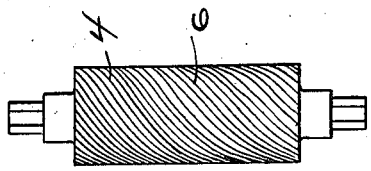
WITNESSES.
INVENTOR.

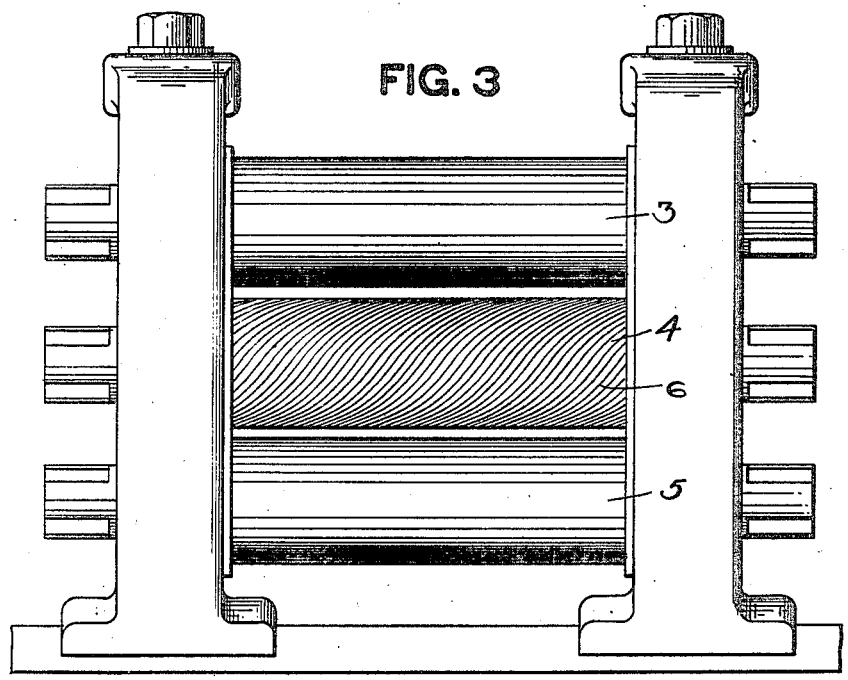
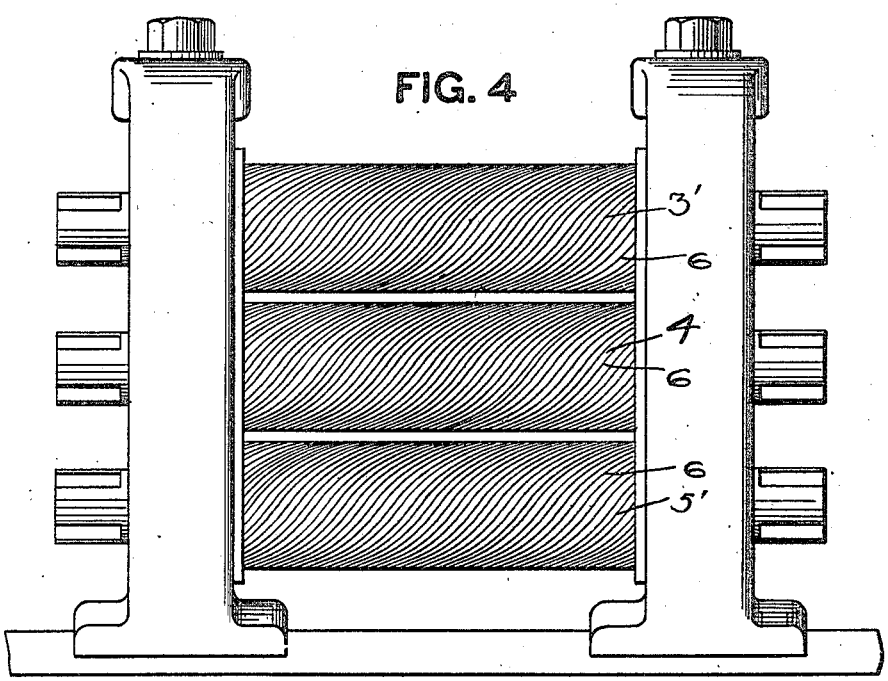

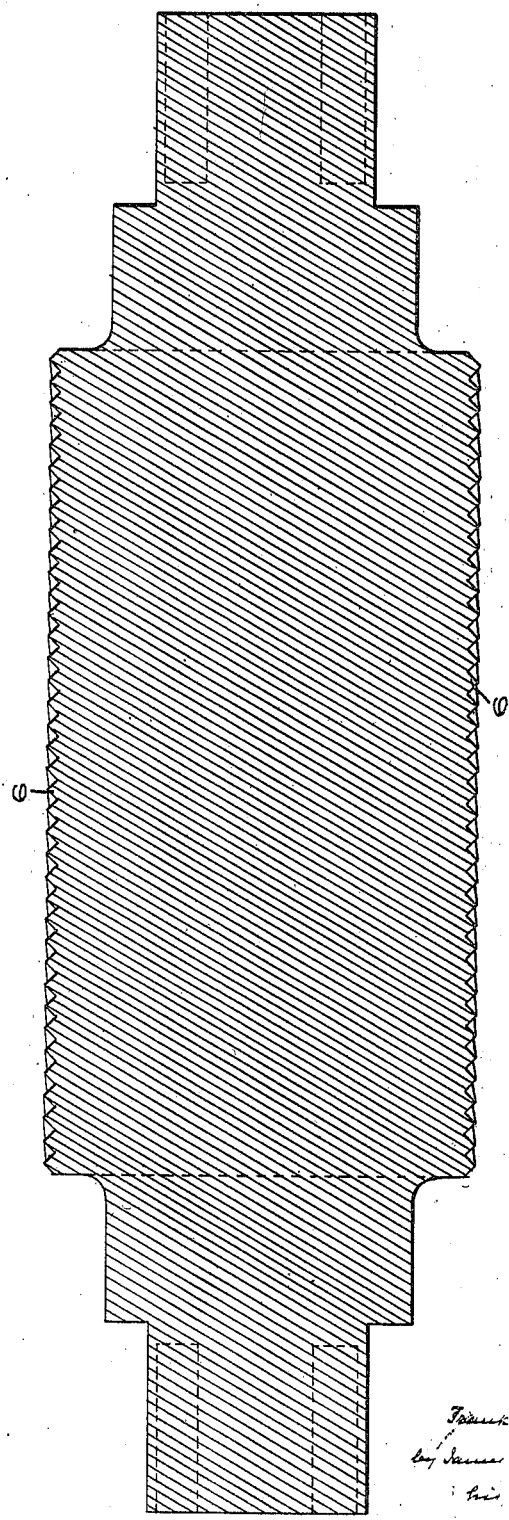

F. L. O. WADSWORTH.
TREATING METAL.
APPLICATION FILED OCT. 21, 1907.

1,050,878.

Patented Jan. 21, 1913.
4 SHEETS—SHEET 4.

WITNESSES.

INVENTOR.

UNITED STATES PATENT OFFICE.

FRANK L. O. WADSWORTH, OF PITTSBURGH, PENNSYLVANIA.

TREATING METAL.

1,050,878.  Specification of Letters Patent.  Patented Jan. 21, 1913.

Application filed October 21, 1907. Serial No. 398,368.

*To all whom it may concern:*

Be it known that I, FRANK L. O. WADSWORTH, a citizen of the United States, residing at Pittsburgh, in the county of Allegheny and State of Pennsylvania, have invented a certain new and useful Improvement in Treating Metal, of which the following is a full, clear, and exact description, reference being had to the accompanying drawings, forming part of this specification, in which—

Figure 6:
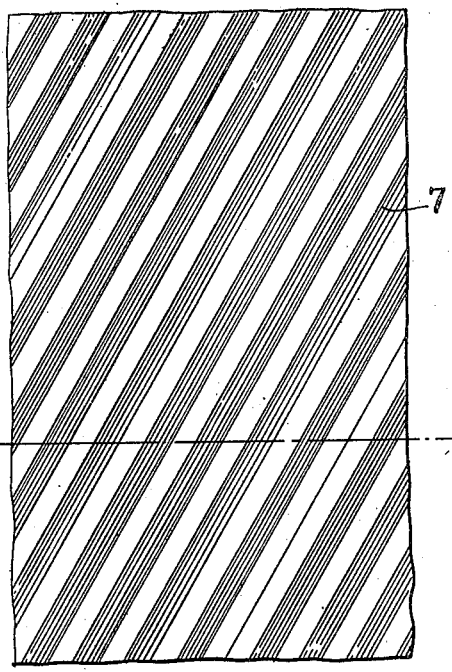
Figure 7:
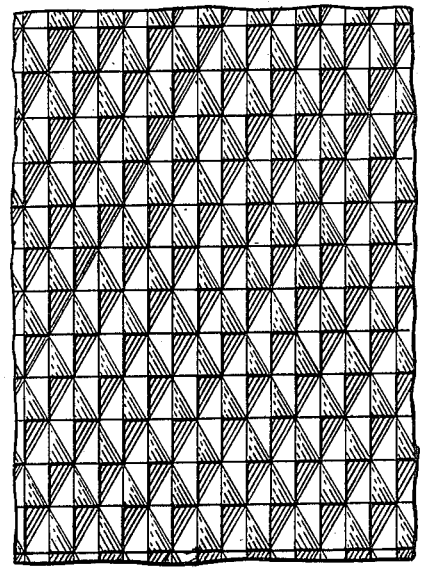
Figure 8:

Figure 1 is a side elevation of a double stand of rolls; Fig. 2 is a plan view showing one of the rolls in each stand which may be employed in the practice of my invention; Fig. 3 is front elevation of one of these three-high stands of rolls; Fig. 4 is a like view of a modification; Fig. 5 is a vertical sectional view of one of these rolls; Fig. 6 is a plan view of a metal plate after it has had a single pass in contact with one of my improved rolls; Fig. 7 is a like view of a plate after it has had other passes; Fig. 8 is a vertical sectional view on the line V—V of Fig. 6.

The object of my invention is to increase the surface density and homogeneity of metal and other materials for the purpose of producing a durable, non-corrosive skin or outer surface, and it consists primarily, in breaking up the fibrous surface structure produced by the ordinary processes of rolling.

It further consists in forming projections on the surface of the metal as it is rendered non-fibrous, and subsequently compressing the projections while the body of the metal is still hot, as is hereinafter more fully described.

In certain manufactures, such as the manufacture of iron, steel, copper, and other metals and materials, it is desirable to secure a tough body and a dense skin or outer surface, free from the usual fibrous structure, which surface should not only be capable of resisting corrosion or abrasion, but should also be free from any tendency to strip or sliver along the lines of rolling. It has been discovered that metal may be densified by increasing the area of the surface without increasing the area of the body metal, and then compressing the increased area of the surface to its original area, and this has been done by forming projections on the surface of the heated metal, and then compressing the projection into a compact shell while the body of the metal is still hot. Heretofore these projections have been formed on the surface of the metal by means of rolls having a checkered or cross-grooved pattern formed on their faces, and by bringing each face of the metal to be treated in contact successively with the portion of the pattern on the face of each roll. The chief objection to this method consists in unevenness in the pattern produced on the surface of the metal and also in the difficulty in cutting the counterpart of the desired pattern on the face of the roll. These objections are overcome by my invention and further advantages are secured, which are hereinafter more fully described.

In Figs. 1 and 2 of the drawing I show diagrammatically stands of three-high rolls 3, 4, and 5, said rolls being of the ordinary construction commonly used. On the face of one or more of the rolls 3, 4, and 5, however, I form a series of spiral V-shaped grooves 6, which may be of any desired pitch and angle and have a depth of about three-sixteenths of an inch. The grooves of this spiral are preferably closely adjacent to each other, as is shown in Fig. 5, in order that closely adjacent continuous diagonal ridges may be formed on the surface of the bloom when the bloom is given a pass in contact with the roll. In Fig. 3 I show a spiral formed only on the middle roll, in Fig. 4 the spiral is shown on all three rolls.

In the operation of the stand of rolls shown in Fig. 3, the article or plate is given a pass between the rolls 4 and 5, which will produce the parallel continuous ridges 7, shown in Fig. 6. In this operation the particles or fibers of metal on the surface of the sheet are subjected to a continuous progressive lateral displacement or at substantially right angles to the direction of rolling by the action of the successive spiral or diagonal ridges on the roll and the longitudinal fibrous surface structure produced by ordinary rolling is thereby prevented or is broken up. When the plate is returned through the pass between the rolls 3 and 4 the diagonal ribs on the upper surface produced by the first pass are flattened down by the smooth roll 3 and a new set of continuous diagonal ribs running at an opposite angle are formed on the lower face of the plate by the middle roll 4. On the next lower pass this last set of ribs is flattened out by the lower smooth roll 5 and the ribs reformed on the upper surface by the middle roll 4. Each time that the ribs are formed, the particles or fibers of metal on the surface are subjected to a continuous lateral displacement and are thereby forced transversely across the sheet. This process can be repeated several times until the surface of the sheet has been sufficiently worked to break up all the initial fibrous character. The plate is then passed to the second stand of rolls and given a series of passes through the rolls 10, 11, and 12, which are similar to rolls 3, 4, and 5, save that the spiral grooves run in the opposite direction. In this operation the particles of metal are again displaced laterally but in a direction opposite to that produced in the first pass through the rolls and the fibrous structure of the surface is still further broken up and the homogeneity and density of the surface still further improved. The plate may then be given one or more passes through a pair of finishing rolls, which will compress the ribs left by the last pass through the second stand to a smooth surface, and an article will be produced having a homogeneous densified shell, free from any longitudinal fibrous structure on both faces. If it is desired to confine the effect to one surface, I may either use stands of two-high reversing rolls, or better, I may use the three-high stand of rolls just described, and reverse the article, plate, or sheet after each pass so that the same face is always in contact with the central ribbed rolls 4 and 11.

In Fig. 4 all the rolls are spirally ribbed and the effect on each pass is to displace the particles of metal in opposite directions on the two surfaces and thereby simultaneously form continuous transverse corrugations or ribs which are opposed to each other on the two sides. When the plate or article is passed to the second stand of rolls, the spirals on which run in the opposite direction from those on the first set, the continuous progressive transverse movement of the particles or fibers on each surface is reversed and two new sets of ribs are formed which cross the ribs formed by the first stand of rolls, and leave the surfaces of the plate in the form illustrated in Fig. 7. As a final operation, the plate or article is taken to an ordinary stand of finishing rolls and the doubly corrugated or ribbed surface rolled down to the final configuration desired. In this view of Fig. 4, rolls 3' and 5' take the place of rolls 3 and 5.

Although I have shown stands of three-high rolls I do not desire to limit myself to the same, as a single roll may be used in connection with a suitable bed-plate, nor do I desire to limit the use of these rolls to producing the continuous ridges on articles or plates, as they may be produced on any thickness or shape of iron, steel, copper, or other metal or material, nor do I desire to limit myself to any number of passes of the metal in contact with the spirally marked roll, as good results may be obtained by compressing the surface of the article or plate after it has had but a single pass and is in the form shown in Fig. 6. Neither do I desire to limit myself to the mounting of rolls with oppositely disposed spirals such as are shown in Fig. 2 in separate stands, as these rolls may sometimes be mounted with these spirally grooved surfaces placed end to end on a common axis in the same stand, the plate being reversed end for end or otherwise between each successive pass through these rolls.

Although I have described the use of spiral ridges and grooves for the purpose of forming ribs which are subsequently compressed to a smooth surface while the body of the metal is still hot, it will be understood that the effect of the spirals on the rolls is not only to form continuous diagonal ribs but is also to subject the surface particles laterally to a continuous progressive displacement as well as longitudinally, that is,—to a displacement at an angle to the direction of rolling. It is this latter action which has the effect of breaking up and preventing the formation of longitudinal fibers or of the usual fibrous formation on the surface of the metal. Metal so treated, may then, while the metal is still hot, be passed through plain rolls, as is hereinbefore described, or where merely a non-fibrous surface is desired, the metal may be used without further treatment, or it may be allowed to cool and be reheated and then passed through finishing rolls merely for the purpose of producing a smooth surface.

Having thus described my invention, what I claim and desire to secure by Letters Patent is:

1. The method of treating metal which consists in rolling the metal longitudinally and simultaneously subjecting the surface fibers throughout the entire width of the metal to a progressive continuous displacement in the same direction at an angle oblique to the direction of rolling.

2. The method of treating metal consisting in forming diagonal ribs extending in the same direction on the surface of the material by a continuous lateral displacement of the surface fibers throughout the entire width of the metal along lines at substantially uniform angles to the direction of rolling.

3. The method of treating metal consisting in forming diagonal ribs extending in the same direction on the surface of the material by a continuous lateral displacement of the surface fibers throughout the entire width of the metal along lines at substantially uniform angles to the direction of rolling, and then compressing the ribs to a smooth surface.

4. The method of treating metal consisting in first treating the metal, forming diagonal ribs extending in the same direction on the surface fibers throughout the entire width of the metal along lines at substantially uniform angles to the direction of rolling, and then compressing the ribs to a smooth surface while the body of the metal is still hot.

5. The method of treating metal which consists in subjecting the surface fibers or particles of the material throughout the entire width of the metal to a continuous progressive diagonal movement or displacement at angles first to the right and then to the left of the direction of rolling.

6. The method of treating metal which consists in forming diagonal ribs on the face of the material by a continuous progressive displacement of the surface portions throughout the entire width of the metal first to one side and then to the other of the direction of rolling, and then compressing the ribs thus formed to a substantially plane surface.

7. The method of rendering the surface of rolled metal non-fibrous which consists in subjecting the surface portions while being rolled to a continuous progressive lateral displacement throughout the entire width of the metal at an angle oblique to the direction of rolling.

8. The method of rendering the surface of metal dense and non-fibrous which consists in forming continuous diagonal ribs or projections extending in the same direction on the surface of the material and throughout the entire width thereof by a continuous progressive lateral displacement of the superficial portions at angles oblique to the direction of rolling, and then compressing the ribs so formed to a substantially plane surface.

9. In a rolling mill, the combination of a stand of rolls having a roll provided with closely adjacent V-shaped spiral parallel grooves, of a second stand of rolls having a roll provided with a plain surface, said stands of rolls being arranged to act successively on the metal to be rolled, whereby a surface is first corrugated and then rolled down smooth.

10. In a rolling mill, the combination with a stand of rolls having a roll provided with closely adjacent V-shaped spiral parallel grooves, or threads, and a second stand of rolls also formed with closely adjacent V-shaped spiral parallel grooves, or threads, of opposite pitch, of a third set of rolls having smooth surfaces, the three stands or sets of rolls being arranged to act successively on the same surfaces of the material to be rolled, whereby a surface is first corrugated in one direction, then corrugated in the opposite direction, and then rolled down smooth.

In testimony whereof, I have hereunto set my hand.

FRANK L. O. WADSWORTH.

Witnesses:
SUZANNE S. BEATTY,
JAMES K. BAKEWELL.